United States Patent [19]

VanGorder

[11] Patent Number: 4,913,093
[45] Date of Patent: Apr. 3, 1990

[54] INTENSIVE AQUACULTURE SYSTEM

[75] Inventor: Steven VanGorder, Breinigsville, Pa.

[73] Assignee: Fresh-Culture Systems, Inc., Northampton, Pa.

[21] Appl. No.: 164,400

[22] Filed: Mar. 4, 1988

[51] Int. Cl.$^4$ .............................................. A01K 61/00
[52] U.S. Cl. ....................................................... 119/3
[58] Field of Search ...................................... 119/2, 3, 4

[56] References Cited

U.S. PATENT DOCUMENTS

| | | | |
|---|---|---|---|
| 3,473,509 | 10/1969 | Miyamura | 119/3 X |
| 3,765,372 | 10/1973 | Moe, Jr. et al. | 119/3 |
| 4,052,960 | 10/1977 | Birkbeck et al. | 119/3 |
| 4,213,421 | 7/1980 | Droese et al. | 119/3 |
| 4,738,220 | 4/1988 | Ewald, Jr. | 119/2 X |

FOREIGN PATENT DOCUMENTS 1110427  8/1984  U.S.S.R. .................................. 119/3

Primary Examiner—Cary E. Stone
Assistant Examiner—R. Thomas Price
Attorney, Agent, or Firm—Ratner & Prestia

[57] ABSTRACT

A growing fish population, started in a single tank is sub-divided as the fish grow so that the capacity of the fish to absorb nutrients and produce waste, throughout the growth process, is matched to the capacity of the container in which they are housed. Each such container is essentially an independent closed loop system with a relatively fixed capacity to aerate heat and filter water as water is recirculated. Preferably several populations are cultured simultaneous, with each at a different stage in the growth process. In this manner relatively constant and efficient use is made of all tanks at all times and the fish harvest is semi-continuous.

5 Claims, No Drawings

INTENSIVE AQUACULTURE SYSTEM

FIELD OF THE INVENTION

This invention relates generally to an improved method of aquaculture in a closed system, and more specifically, to an improved method for efficiently culturing and harvesting fish at a relatively constant rate.

BACKGROUND OF THE INVENTION

Aquaculture system and processes for growing fish, under controlled conditions are well known. These systems and processes may be open (i.e. water is constantly replenished from an outside source) or closed (i.e. water is continuously cleaned, aerated and recirculated through the system).

To date, the vast majority of fresh-water aquaculture involves either the culture of catfish or trout, in open systems, requiring stringent levels of water resource availability and complimentary climatic conditions. Furthermore, operating costs associated with such open systems are substantial in that they usually require relatively large tracts of land and substantial electrical and mechanical energy for maintaining water quality levels.

A closed-loop aquaculture system offers many advantages over an open system. For example, since water is constantly reused, expenses for supplying, moving and storing water is minimized. Additionally, the expenses associated with maintaining water temperature in a closed-loop system are considerably lessened, since once a volume of water is brought to a desired temperature, little energy is required to maintain that temperature. Also, undesirable fluctuations in temperature and water quality can be eliminated.

Closed-loop aquaculture systems are disclosed, for example, in "Home Aquaculture: A Guide to Backyard Fish Farming" by S. D. VanGorder (inventor herein) and D. J. Strange, Rodale Press, 1983. That publication, which is incorporated herein by reference, discloses season-dependent, single tank, small-scale aquaculture systems. These sytems are usually comprised of a twelve by three foot swimming pool, which serves as the fish culture tank. According to the methods disclosed in that reference, fish are raised from fingerling size to about one pound during the course of a growing cycle, which takes place in a single tank. The growing cycle, from stocking of the fingerlings to harvest of the mature fish is normally about six months.

Another aquaculture system is disclosed in U.S. Pat. No. 4,030,450, which pertains to a method and apparatus for aquaculture in a recirculating closed-loop system. In general, the method and apparatus of that patent provide for continuously maintaining and feeding food to fish for a period of months until they reach marketable size. The preferred water to fish ratio is at least about one fish per gallon of water. Water recirculation is intermittent and is dependent on fish size, since circulation is less necessary when the cultured fish are small than when they are more fully grown.

Other aquaculture systems and methods include those disclosed in U.S. Pat. No. 3,973,519 pertaining to a screening apparatus for retaining small marine animals in a growing container connected to a closed-loop aquaculture system; U.S. Pat. No. 3,761,262 pertaining to a filtration and circulation system for maintaining water quality in a fish tank; U.S. Pat. No. 3,661,119 pertaining to a fish larvae rearing tank and an associated circulation and filtration system associated therewith; and U.S. Pat. No. 4,212,268 pertaining to an aquaculture habitat for the rearing of post-larval crustacea in a cellular honeycomb structure.

In a typical fish aquaculture system, fish are stocked at whatever density is necessary to reach the capacity of the system when the fish have reached harvest size. For example, if an acre catfish pond is expected to produce 5,000 pounds of one pound fish, then 5,000 fingerling fish are stocked in the spring, and fed at that density throughout the summer. Of course, this means that for most of the entire growing season, the pond is being used to much less than its capacity of 5,000 pound of fish.

BRIEF DESCRIPTION OF THE INVENTION

In the system and method of the present invention, fish population is cultured in a plurality of containers, each container comprising a growing environment with a relatively fixed capacity for providing nutrients and removing waste from the culture medium (water) in the container. The fish population has a growth cycle characterized by an increasing capacity to absorb nutrients and produce waste as the fish grow. The improved method comprises periodically subdividing the fish population from one container into multiple containers at intervals when the capacity of the fish population to absorb nutrients and to produce wastes becomes excessive relative to (i.e. equal to or somewhat greater than) the system's capacity to introduce nutrients and remove wastes.

The preferred method of the invention comprises simultaneously culturing a plurality of fish populations at different stages of growth so that the total number of containers in use at all times remains relatively constant and fish harvesting is semi-continuous.

DETAILED DESCRIPTION OF THE INVENTION

The present invention is based upon utilization of a plurality of tanks for growing environments, each comprising a relatively independent system, including means for introducing feed, means for recirculating and heating water and in the course of recirculation filtering and aerating the water, all as described in the literature referred to above.

Typically, such a growing environment or system has a relatively fixed capacity for water recirculation, filtration and aeration. This is a limiting factor in the amount of fish growth which can be produced in that environment. A growing fish population, on the other hand has a constantly increasing capacity to consume nutrients, including air, and to produce waste products, as the fish population grows.

The present invention's system for the continuous production and harvest of fresh fish from a closed-system aquaculture design depends on the use of a multiple tank design, each with its own capability for biofiltration, clarification, aeration, heating, and insulation. In such closed systems, water quality control must be strictly observed, particularly because of the relatively constant and high nutrient input levels. In order to maintain optimal conditions for fish growth, several methods for maintaining water quality are employed, essentially as a unified or a combined approach. Because a primary advantage of the present invention is its relatively low operational costs, in order to be economically feasible in accomplishing the continuous production described herein, certain adaptations of otherwise known water treatment techniques and apparatus are necessary.

For example, in order to circulate water through the system's components with low energy utilization, all water levels must be kept relatively at the same level. Water can then be easily moved from the tank into an associated clarifier and then into an associated biofiltration tank and then finally back into the tank using an air lift. The air lift is a device for moving water by means of air. It is generally a U-shaped tube having in one end a connection for an air source. When placed between adjacent water compartments, air delivered inside of the tube drives the water out of the tube and into the adjacent compartments. If, as in the present invention the compartments are also connected beneath the level of the tube, water removed from one compartment causes the water in the adjacent compartment to adjust in response to the influx of water. Thus, water levels are uniformly maintained with water movement being more or less constant in response to the removal and influx of water.

Similarly, aeration costs are also reduced relative to other fish production methods. Aeration is accomplished using low pressure/high volume air blowers. The depth of water is necessarily shallow to accomplish this. Particulate matter such as unconsumed fish feed and fish wastes are removed by circulating the water through a baffle-type clarifier which causes solids to settle out before the water is treated by the bio disk filtration system. The biodisc filtration system provides efficient ammonia removal without subsequent clogging of the filter with solid waste, and also operates using only air for the turning of the filter. The efficiency of the filtration system is enhanced further because of the multiple-tank design, requiring a quantity of much smaller individual filters, in essence increasing the water to filter-surface ratio, as compared to other fish growing schemes.

Thus, the overall multiple-tank concept as embodied in the present invention considers all of the relevant environmental parameters, including tank size (circulation rate, pumping rate through the filters, production capacity/volume), aeration method, clarifier sizing, heating and insulation efficiency, as well as feeding techniques and density manipulations. Furthermore, by following the production scheme of the present invention, other immediate advantages include the ability to monitor fish growth as well as keeping all multiples of the system separate for disease control.

In accordance with the present invention, the fish population growth cycle is divided into a number of intervals or phases in which the fish population is subdivided at the beginning of each interval or phase and thus the fish population or subdivisions thereof in the successive intervals are all relatively well matched, in their capacity to absorb nutrients and to produce wastes, with the relatively fixed capacity of each independent growing environment to aerate and remove waste from the recirculating water in that environment.

Thus, at the beginning of the growth cycle, the number of fingerlings introduced into one of the tanks or containers is selected so that the capacity of the tank or container to aerate and remove wastes from the recirculating growth medium (water) is comparable but somewhat greater than the capacity of the fingerlings to consume nutrients, including air, and produce wastes. As the fingerlings grow and their capacity to consume nutrients and produce waste become excessive relative to the capacity of the container to provide nutrients and remove waste, the fingerling population is subdivided. This is done by removing part of the fish population. For example, approximately one-half of the fingerling fish population may be placed in one additional tank or container. The growth cycle then proceeds until the subdivided fish populations' capacity to consume nutrients and produce waste again becomes excessive relative to the capacity of the individual containers, in which the sub-division of the original population is contained. At that point, the subdivided fish population is again subdivided, this time, for example, by again removing one-half of the fish in each of the two containers and evenly distributing them into two additional containers. In this manner, the capacity of all of the containers to introduce nutrients, filter the recirculating water and remove wastes from it, is used relatively efficiently throughout the fish growth cycle.

Preferably, a number of fish populations are simultaneously grown in this manner with the beginning of the growth cycle for each of the populations offset by the length of one interval or growth phase, so that at any one time a relatively constant number of containers are in use.

Typically, the method of the instant invention is carried out in a plurality of thermally insulated culture tanks, each of which has an associated bio-disk filtration and clarifier system. The insulated culture tanks are preferably circular, about 10 feet in diameter and 40 inches high. The tanks are also preferably raised above the ground so that associated piping, located below the tanks, may be easily installed and accessed. An air lift provides for movement of the water from compartment to compartment. Thus, water moves from the tank to the clarifier and to the biofilter and finally back into the tank without the use of a siphon, simply by maintaining a constant water in all compartments. Each tank also has associated with it an aeration and heating system which provides oxygen and heat for the fish. The aerator preferably also may provide for rotating the bio-disk filter and differential pressure to operate an integrally associated air-lift flow system.

By way of example of the present invention, a first tank is stocked with a quantity of fish, typically about 4,000 fingerling. The fingerlings are supplied nutrients such as food and oxygen, and their waste is removed through a bio-disk filter/clarification system. Fish are raised in a first tank for a six week period, after which one half of the fish are removed and placed in a second tank. The preferred six-week period may be longer or shorter depending upon the species of the fish or the ability of the tank and the associated filtration system to effectively handle waste products. In any event when the capacity of the fish population to absorb nutrients and produce wastes becomes excessive relative to the system's capacity to introduce nutrients and remove wastes, the fish population is again subdivided from two tanks into four and six weeks later this population is divided again into eight tanks where they remain for an additional six week period until such time as they are ready for harvest.

From the above-described method, it can be seen that where the first tank is supplied with 4,000 fingerling fish, after three sequential density manipulations, by subdivision into additional tanks, and with proper feeding, each of the eight harvest tanks should contain approximately 500 fish weighing over one pound each.

A preferred density manipulative sequence in utilizing the present invention is to have 15 tanks and 4 fish populations (of varying sizes) in process at any one time, with staggered growth cycles so that when a first tank is divided between the first and the second tank a third tank is then stocked with fingerlings. When the third tank reaches optimum capacity, this tank as well as the first and second tanks are likewise divided into additional tanks.

This scheme is best illustrated by reference to Table 1 in which there is shown a tank manipulative sequence, by which 15 tanks are kept in relatively constant use, at relatively optimum fish growing conditions through a cycle of about 6 months. Each fish population is subdivided four times. A population which is loaded originally as fingerlings in one tank is eventually harvested 6 months later from 8 tanks. This tank utilization sequence provides an appropriate number of tanks so that each tank will be operating at or near capacity at all times and so that 8 out of the 15 tanks can provide a standard harvest weight of fish every six weeks.

While the present invention has been described with reference to specific embodiments thereof, the invention is not limited thereto. The method and apparatus of this invention may in fact include systems with other numbers of tanks. The manipulative sequence to effect relatively constant output may also be varied considerably. All such variants, however, are within the scope of the present invention. The appended claims are intended to be construed to encompass all such variants as may be devised by those skilled in the art without departing from the true spirit and scope of this invention.

cycle characterized by an increasing capacity (the fish capacity) to consume both nutrients and oxygen and to produce waste as said fish grow, wherein the method comprises:
(a) introducing a first fish population of fingerlings into a first tank;
(b) periodically subdividing the first fish population into a multiple thereof and introducing each subdivided fish population into a separate tank of a corresponding number of additional tanks as the fish capacity of the first fish population becomes equal to or somewhat greater than the tank capacity of the first tank;
(c) periodically further subdividing each subdivided fish population into a multiple thereof as the fish capacity of each subdivided fish population becomes equal to or somewhat greater than the tank capacity of each corresponding tank; and
(d) repeating step (c) until the fish in each subdivided fish population have reached a desired size.

2. The method as recited in claim 1 wherein the number of fish in the first fish population and each subdivided fish population derived therefrom is selected so that the tank capacity of each tank is equal to or somewhat greater than the fish capacity of each population at the beginning of each growth phase.

3. The method as recited in claim 1 further comprising simultaneously culturing a plurality of fish populations each at different stages in said growth process, said stages being selected so that the total number of tanks in use at all times remains relatively constant.

4. The method as recited in claim 3 wherein said fish have a total growth cycle of about twentyfour weeks,

TABLE 1

STOCKING/HARVEST SEQUENCE
(15 TANK SYSTEM)

| Date | Set #1 Activity/Tank # | Set #2 Activity/Tank # | Set #3 Activity/Tank # | Set #4 Activity/Tank # |
|---|---|---|---|---|
| Jan 1 | Harvest/All Stock 1 | Divide 2, 7, 13, 14 ≧ 3, 5, 6, 9 | Divide 4, 15 ≧ 10, 11 | Divide 8 ≧ 12 |
| Feb 15 | Divide 1 ≧ 3 | Harvest/All Stock 2 | Divide 4, 15, 10, 11 ≧ 5, 6, 7, 9 | Divide 8, 12 ≧ 13, 14 |
| Apr 1 | Divide 1, 3 ≧ 5, 6 | Divide 2 ≧ 7 | Harvest/All Stock 4 | Divide 8, 12, 13, 14 ≧ 9, 10, 11, 15 |
| May 15 | Divide 1, 3, 5, 6 ≧ 9, 10, 11, 12 | Divide 2, 7 ≧ 13, 14 | Divide 4 ≧ 15 | Harvest/All Stock 8 |
| July 1 | Repeat | Repeat | Repeat | Repeat |

Tank Set #1
(1, 3, 5, 6, 9, 10, 11, 12)
Tank Set #2
(2, 3, 5, 6, 7, 9, 13, 14)
Tank Set #3
(4, 5, 6, 7, 9, 10, 11, 15)
Tank Set #4
(8, 9, 10, 11, 12, 13, 14, 15)

What is claimed:
1. A method of culturing fish in a plurality of tanks, each tank comprising a relatively independent growing environment for said fish and each tank having a maximum capacity (the tank capacity) for providing nutrients, aeration and waste removal for fish in each said tank, said fish forming a population having a growth said periodic subdivision occurs at an interval of six weeks and said total number of tanks is fifteen.

5. The method as recited in claim 1 wherein said fish are selected from the group consisting of tilapia, catfish, salmon, trout, hybrid striped bass and red fish.

* * * * *